United States Patent
Yamato et al.

(10) Patent No.: US 8,350,817 B2
(45) Date of Patent: Jan. 8, 2013

(54) DISPLAY DEVICE PROVIDED WITH TOUCH PANEL

(75) Inventors: Asahi Yamato, Tokyo (JP); Kazuki Takahashi, Tokyo (JP); Jun Nakata, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 12/306,634

(22) PCT Filed: May 28, 2007

(86) PCT No.: PCT/JP2007/060828
§ 371 (c)(1),
(2), (4) Date: Dec. 24, 2008

(87) PCT Pub. No.: WO2008/032476
PCT Pub. Date: Mar. 20, 2008

(65) Prior Publication Data
US 2009/0303195 A1 Dec. 10, 2009

(30) Foreign Application Priority Data

Sep. 11, 2006 (JP) ................................. 2006-245436

(51) Int. Cl.
*G06F 3/041* (2006.01)
(52) U.S. Cl. ........................................................ 345/173
(58) Field of Classification Search .................. None
See application file for complete search history.

(56) References Cited

U.S. PATENT DOCUMENTS

| | | | | |
|---|---|---|---|---|
| 4,740,781 A * | 4/1988 | Brown | ........................... | 345/174 |
| 6,172,721 B1 * | 1/2001 | Murade et al. | ................... | 349/43 |
| 6,982,432 B2 * | 1/2006 | Umemoto et al. | ............... | 257/12 |
| 7,109,967 B2 * | 9/2006 | Hioki et al. | .................... | 345/104 |
| 7,138,986 B2 * | 11/2006 | Ohtsuka | ......................... | 345/175 |
| 7,242,448 B2 * | 7/2007 | Okumura | ........................ | 349/114 |
| 7,442,914 B2 * | 10/2008 | Eliasson et al. | ............... | 250/221 |

FOREIGN PATENT DOCUMENTS

| | | |
|---|---|---|
| JP | 2000-155551 | 6/2000 |
| JP | 2002-014772 | 1/2002 |
| JP | 2003-099192 | 4/2003 |
| JP | 2005-182152 | 7/2005 |
| JP | 2008-032756 | 2/2008 |
| WO | 2006/054585 | 5/2006 |

OTHER PUBLICATIONS

International Search Report for PCT/JP2007/060828, mailed Aug. 21, 2007.

* cited by examiner

*Primary Examiner* — K. Wong
(74) *Attorney, Agent, or Firm* — Nixon & Vanderhye P.C.

(57) ABSTRACT

A display device provided with a touch panel for detecting a contact position on a touch surface of the panel at which a contact object is brought into contact with the touch surface, the touch panel including an in-panel-surface electrode with a plurality of openings formed in a display area.

22 Claims, 6 Drawing Sheets

DISPLAY DEVICE PROVIDED WITH TOUCH PANEL

This application is the U.S. national phase of International Application No. PCT/JP2007/060828, filed 28 May 2007, which designated the U.S. and claims priority to Japanese Patent Application No. 2006-245436, filed 11 Sep. 2006, the entire contents of each of which are hereby incorporated by reference.

TECHNICAL FIELD

The present invention relates to a display device provided with a touch panel.

BACKGROUND ART

Touch panels, attached on display elements such as liquid crystal display elements, have been researched and developed, as one of the input means for liquid crystal display devices, etc. A touch panel of this type normally includes a flat-plate electrode formed on an insulative substrate such as a glass substrate for detecting the contact position based on an electric signal that is influenced by changes in capacitance occurring when a contact object is brought into contact with the panel surface.

Since an electrode in a panel surface used in a touch panel as described above is required to have a high resistance and a high transmittance, a thin transparent conductive film such as an ITO film (thickness: about 100 Å) has been mainly used as disclosed in, for example, Patent Document 1, Patent Document 2, etc.

Patent Document 1: Japanese Laid-Open Patent Publication No. 2003-099192
Patent Document 2: Japanese Laid-Open Patent Publication No. 2002-014772

DISCLOSURE OF THE INVENTION

Problems to be Solved by the Invention

Herein, it is required for an electrode provided in a touch panel that the electrode has a high resistance and the parasitic capacitance formed between the electrode and an electrode, wiring, etc., of a display panel to be layered together is small so that the precision with which the touch position of the electrode is detected by the detection device is high.

However, if a touch panel with a smooth electrode surface is used, it is difficult to realize a high resistance, and the touch position detection precision deteriorates since the parasitic capacitance increases.

Means for Solving the Problems

It is an object of the present invention to provide a display device provided with a touch panel, in which the touch position detection precision is high.

A display device provided with a touch panel of the present invention is a display device provided with a touch panel for detecting a contact position on a touch surface of the panel at which a contact object is brought into contact with the touch surface, the touch panel including an in-panel-surface electrode with a plurality of openings formed in a display area.

With such a configuration, a plurality of openings are formed in the display area of the in-panel-surface electrode, and it is possible to accordingly increase the resistance value of the in-panel-surface electrode. Since the area of the inpanel-surface electrode is reduced by the openings, it is possible to accordingly decrease the parasitic capacitance and increase the light transmittance. Therefore, the touch position detection precision of the touch panel is improved.

In the display device provided with a touch panel of the present invention, the in-panel-surface electrode may be formed so that an aperture ratio thereof increases toward a center of the display area.

With such a configuration, since the in-panel-surface electrode is formed so that the aperture ratio thereof increases toward the center of the display area, it is possible to correct the distortion between the voltage in the in-panel-surface electrode detected by the touch panel and the detected position, whereby it is possible to simplify the arithmetic operation for the panel detected position correction.

In the display device provided with a touch panel of the present invention, the aperture ratio of the in-panel-surface electrode may quadratically increase toward the center of the display area.

With such a configuration, the aperture ratio of the in-panel-surface electrode quadratically increases toward the center of the display area, whereby it is possible to more precisely correct the distortion between the voltage in the in-panel-surface electrode detected by the touch panel and the detected position, and it is possible to further simplify the arithmetic operation for the panel detected position correction.

In the display device provided with a touch panel of the present invention, the plurality of openings may be formed regularly on a surface of the in-panel-surface electrode.

With such a configuration, a plurality of openings are formed regularly on the surface of the in-panel-surface electrode, and it is possible to form the openings evenly across the entire display area of the panel surface, thus further improving the touch position detection precision of the touch panel.

In the display device provided with a touch panel of the present invention, the in-panel-surface electrode may be formed in a generally lattice pattern having the plurality of openings.

In the display device provided with a touch panel of the present invention, a liquid crystal display panel having a color filter may be further provided so as to be layered on the touch panel.

With such a configuration, it is possible to obtain a liquid crystal display device provided with a touch panel having an improved touch position detection precision.

In the display device provided with a touch panel of the present invention, the in-panel-surface electrode may be formed on a substrate on which the color filter of the liquid crystal display panel is formed.

In the display device provided with a touch panel of the present invention, the in-panel-surface electrode may be formed on one side of the substrate on which the color filter is formed that is closer to a liquid crystal layer.

In the display device provided with a touch panel of the present invention, the color filter may include a plurality of pixels arranged in a matrix pattern.

In the display device provided with a touch panel of the present invention, the pixels of the color filter may be provided in regions opposing the openings of the in-panel-surface electrode.

With such a configuration, since the pixels of the color filter are provided in regions opposing the openings of the in-panel-surface electrode, it is possible to suppress the lowering of the brightness and the reflectance of the display panel and to thereby improve the display quality.

In the display device provided with a touch panel of the present invention, an area of a pixel of the color filter may be smaller than that of an opening of the in-panel-surface electrode.

With such a configuration, since the area of a pixel of the color filter is smaller than that of an opening of the in-panel-surface electrode, it is possible to more accurately suppress the lowering of the brightness and the reflectance of the display panel, and to thereby improve the display quality.

In the display device provided with a touch panel of the present invention: the color filter may include a light-blocking portion provided in a line pattern so as to surround the pixels; and a line width of the light-blocking portion may be larger than each lattice line width of the in-panel-surface electrode formed in a lattice pattern.

With such a configuration, even if there is mask shifting when forming the light-blocking portion of the color filter on a substrate by way of masking, or the like, it is possible to prevent the in-panel-surface electrode from covering the pixels of the color filter, and to thereby improve the display quality, because the line width of the light-blocking portion is larger than each lattice line width of the in-panel-surface electrode.

In the display device provided with a touch panel of the present invention, a plurality of openings may be formed also in a frame region surrounding the display area on the in-panel-surface electrode.

In the display device provided with a touch panel of the present invention, an aperture ratio of the frame region of the in-panel-surface electrode may increase toward the display area.

In the display device provided with a touch panel of the present invention, the aperture ratio of the frame region may quadratically increase toward the display area.

In the display device provided with a touch panel of the present invention, an aperture ratio of the frame region may be lower than that of the display area.

With such a configuration, the display area is a high-resistance electrode portion, whereas the frame region in contrast is a low-resistance electrode portion. Therefore, the panel surface position detection precision is further improved. Moreover, it is not necessary to separately form a low-resistance electrode outside the display area, thereby improving the device production efficiency.

In the display device provided with a touch panel of the present invention, an aperture ratio of the frame region may decrease along each side of the frame region toward a center thereof.

In the display device provided with a touch panel of the present invention, an aperture ratio of the frame region may quadratically decrease along each side of the frame region toward a center thereof.

In the display device provided with a touch panel of the present invention, the in-panel-surface electrode may be formed by a transparent conductive material.

With such a configuration, since the in-panel-surface electrode is formed by a transparent conductive material, it is possible to increase the light transmittance and to improve the display performance of the panel surface.

In the display device provided with a touch panel of the present invention, the transparent conductive material may be at least one of ITO, IZO, ZnO and $SnO_2$.

With such a configuration, since the transparent conductive material is at least one of ITO, IZO, ZnO and $SnO_2$, it is possible to increase the light transmittance and to improve the display performance of the panel surface.

In the display device provided with a touch panel of the present invention: the in-panel-surface electrode may be formed in a rectangular shape; and current detection means for detecting a current flowing through the in-panel-surface electrode may be electrically connected to each of four corners of the in-panel-surface electrode formed in a rectangular shape.

With such a configuration, it is possible to improve the touch position detection precision of the touch panel including the in-panel-surface electrode which is formed in a rectangular shape with current detection means being electrically connected to four corners thereof.

The display device provided with a touch panel of the present invention may further include an EL display panel, the EL display panel including: a first substrate including an electrode, and a second substrate opposing the first substrate; and an EL element provided between the first and second substrates, wherein the touch panel is provided so as to be layered on the second substrate of the EL display panel.

With such a configuration, it is possible to obtain an EL display device provided with a touch panel having an improved touch position detection precision.

Effects of the Invention

According to the present invention, it is possible to provide a display device provided with a touch panel having an improved touch position detection precision.

DESCRIPTION OF REFERENCE NUMERALS 10, 82 Touch panel
12 In-panel-surface electrode
17 Opening
13 Bezel wiring (frame region)
50, 80 Liquid crystal display device
60, 81 Liquid crystal display panel
61, 92, 99 Glass substrate
62 TFT substrate 63 Color filter
64 Glass substrate
65 CF substrate
67 Pixel electrode
68 Counter electrode
70 Pixel
71 Light-blocking portion
90 EL display device
91 EL display panel
93 First electrode
98 Second electrode

BEST MODE FOR CARRYING OUT THE
INVENTION

Embodiment

A liquid crystal display device will now be described in detail with reference to the drawings, as a display device provided with a touch panel according to an embodiment.

(Configuration of Liquid Crystal Display Device 50 Provided with Touch Panel 10)

Figure 1:
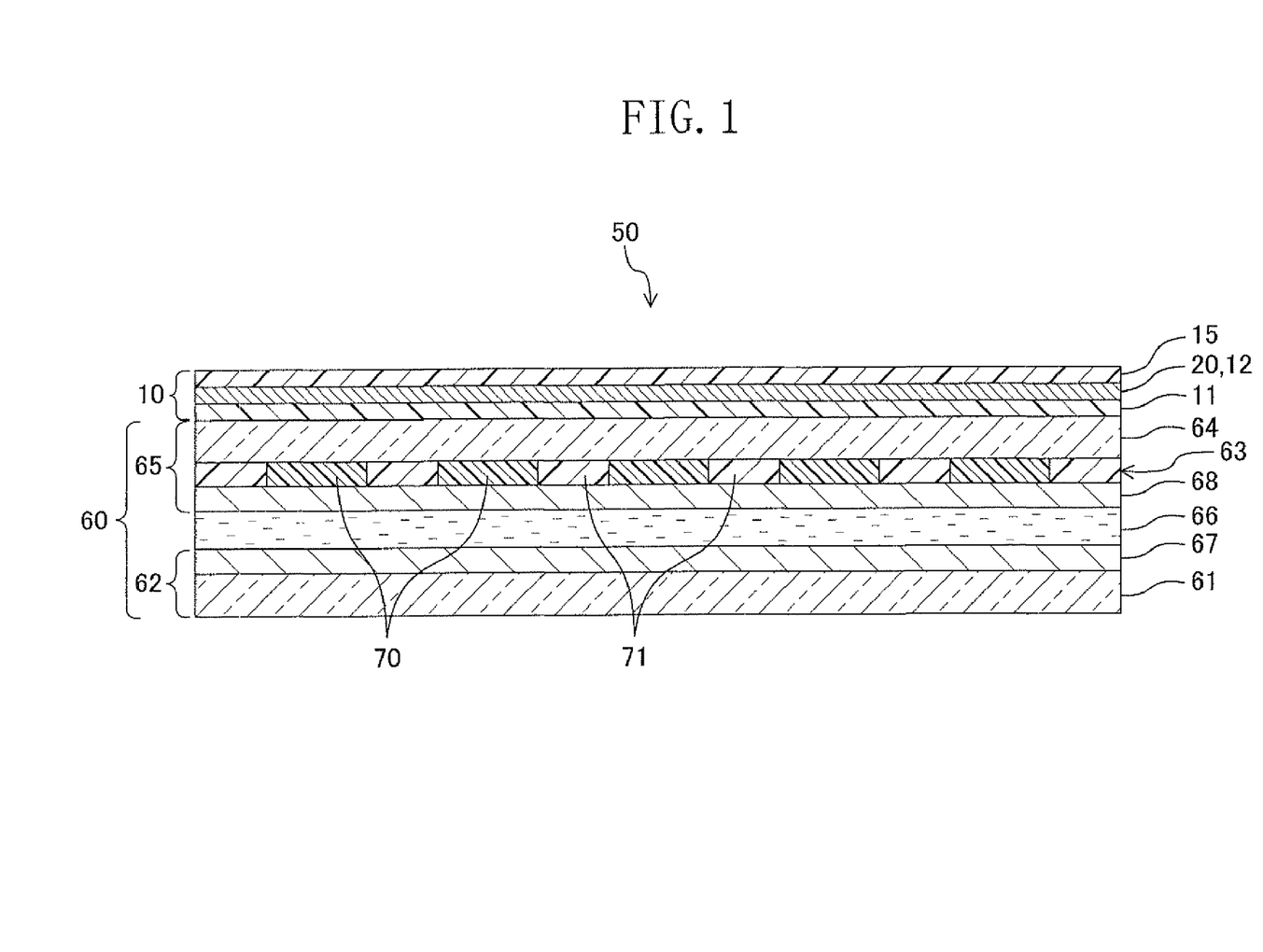
FIG. 1 is a cross-sectional view of a liquid crystal display device 50 provided with a touch panel 10 according to an embodiment of the present invention.

FIG. 1 is a cross-sectional view of a liquid crystal display device 50 provided with a touch panel 10 according to an embodiment of the present invention.

The liquid crystal display device 50 includes the touch panel 10, a liquid crystal display panel 60 provided on the reverse surface of the touch panel 10, and a backlight (not shown) provided on the reverse surface of the liquid crystal display panel 60.

Figure 2:
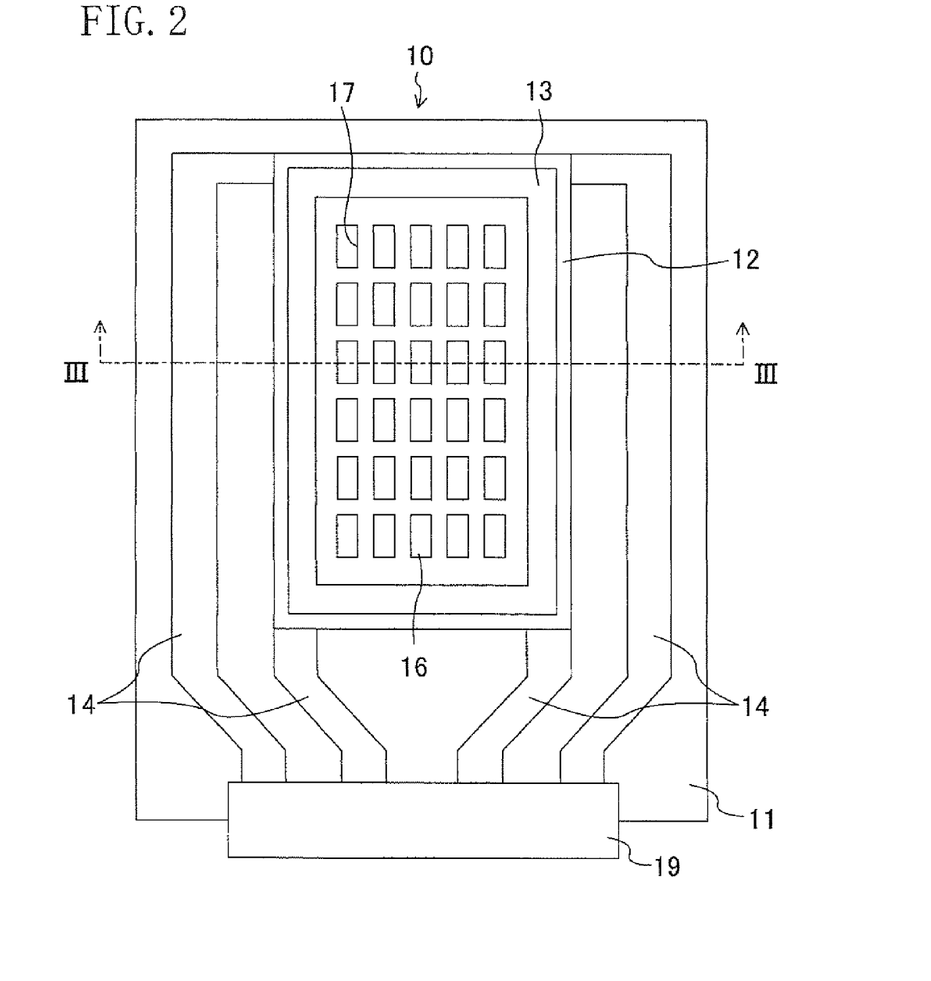
FIG. 2 is a plan view of the touch panel 10 according to an embodiment of the present invention.
Figure 3:
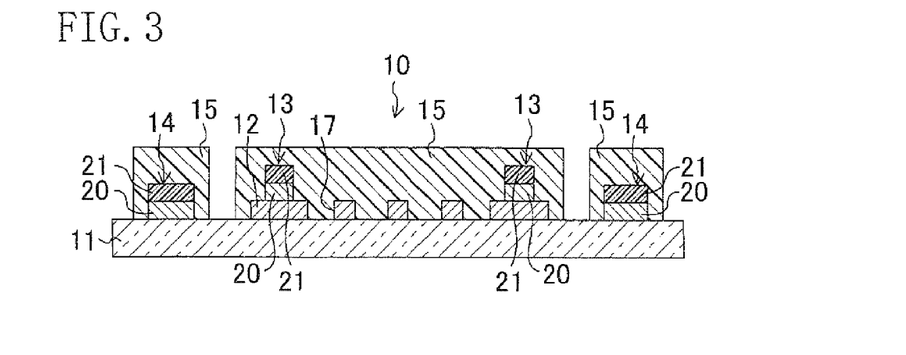
FIG. 3 is a cross-sectional view of the touch panel 10 taken along line III-III of FIG. 2.

First, the touch panel 10 will be described. FIG. 2 shows a plan view of the touch panel 10, and FIG. 3 shows a cross-sectional view of the touch panel 10 taken along line III-III of FIG. 2.

The touch panel 10 includes an insulative substrate 11, an in-panel-surface electrode 12 formed on the insulative substrate 11, a bezel wiring (frame region) 13 arranged so as to form a bezel along four sides on the in-panel-surface electrode 12, an outer wiring 14 (the current detection means) formed on the insulative substrate 11 and electrically connected to the four corners of the in-panel-surface electrode 12, and a protection film 15 formed on the insulative substrate 11 so as to cover the in-panel-surface electrode 12, the bezel wiring 13 and the outer wiring 14.

The insulative substrate 11 is formed in a rectangular shape using an insulative material such as a glass or a resin.

The in-panel-surface electrode 12 is formed by using a metal such as platinum, gold, platinum, silver, copper, aluminum or palladium, or a transparent conductive material such as ITO (Indium Tin Oxide), IZO (Indium Zinc Oxide), ZnO or SnO$_2$. Therefore, it is possible to increase the light transmittance and to improve the display performance of the panel surface. The in-panel-surface electrode 12 is arranged so as to cover the touch surface of the touch panel 10, i.e., arranged in a touch surface corresponding region 16, and is shaped in a rectangular shape. The in-panel-surface electrode 12 is formed so that the thickness thereof is about 100 Å, for example.

The in-panel-surface electrode 12 is formed in a lattice pattern with a plurality of rectangular openings 17. Since the in-panel-surface electrode 12 includes the plurality of openings 17, it is possible to increase the resistance value of the electrode. Moreover, since the area of the electrode is reduced by the openings 17, it is possible to accordingly decrease the parasitic capacitance and increase the light transmittance. Moreover, since the plurality of openings 17 are formed regularly on the surface of the in-panel-surface electrode 12, it is possible to form the openings 17 evenly across the entire display area of the panel surface, thus improving the touch position detection precision of the touch panel 10.

The in-panel-surface electrode 12 is formed so that the aperture ratio thereof quadratically increases toward the center of the display area by adjusting the size of the plurality of openings 17. Specifically, the openings 17 are formed so that ones closer to the center of the display area are gradually larger, with the area of an opening 17 quadratically increasing toward the closest opening 17 (closer to the display area). Therefore, it is possible to more precisely correct the distortion between the voltage in the in-panel-surface electrode 12 detected by the touch panel 10 and the detected position, and it is possible to further simplify the arithmetic operation for the panel detected position correction.

The bezel wiring 13 is arranged on the in-panel-surface electrode 12 formed in a rectangular shape so as to form a bezel along four sides on the in-panel-surface electrode 12. The bezel wiring 13 includes a conductive layer 20, and a protection layer 21 formed on the conductive layer 20.

The conductive layer 20 of the bezel wiring 13 is formed by using a metal such as platinum, gold, platinum, silver, copper, aluminum or palladium, or a transparent conductive material such as ITO, IZO, ZnO or SnO$_2$, or a polymer conductive material. The conductive layer 20 of the bezel wiring 13 is formed so that the thickness thereof is about 2000 Å, for example.

The protection layer 21 of the bezel wiring 13 is not limited to any particular type as long as it protects the conductive layer 20 from corrosion, or the like, and is formed by using a titanium nitride, or the like, for example. The protection layer 21 of the bezel wiring 13 is formed so that the thickness thereof is about 1000 Å, for example.

The outer wiring 14 includes four wires on the insulative substrate 11 electrically connected to the four corners of the in-panel-surface electrode 12. One end of the outer wiring 14 is electrically connected to one of the four corners of the in-panel-surface electrode 12, with the other end extending toward the same direction to be electrically connected to a driver circuit 19 to be described below. Similar to the bezel wiring 13, the outer wiring 14 includes the conductive layer 20, and the protection layer 21 formed on the conductive layer 20. The conductive layer 20 and the protection layer 21 of the outer wiring 14 are formed by similar materials with similar thicknesses to those of the conductive layer 20 and the protection layer 21 of the bezel wiring 13.

The protection film 15 is formed on the insulative substrate 11 so as to cover the in-panel-surface electrode 12, the bezel wiring 13 and the outer wiring 14. The protection film 15 is formed by, for example, an inorganic insulating film such as silicon nitride or a silicon oxide film, an organic SOG film, a photosensitive organic resin film, or the like.

Next, the liquid crystal display panel 60 will be described. As shown in FIG. 1, the liquid crystal display panel 60 includes a TFT substrate 62 having a glass substrate 61, and a CF substrate 65 on which a color filter 63 is formed and which includes a glass substrate 64. A liquid crystal layer 66 and a spacer (not shown) are formed between the TFT substrate 62 and the CF substrate 65.

The TFT substrate 62 includes pixel regions formed in a matrix pattern on the liquid crystal layer 66, with a pixel electrode 67, a thin film transistor, etc., being formed for each pixel region. The TFT substrate 62 includes a driver IC (not shown) provided in the substrate end portion thereof. A flexible printed circuit board (not shown) with a controller (not shown) formed thereon is provided in the substrate end portion of the TFT substrate 62.

The driver IC and the driver circuit 19 of the touch panel 10 are each electrically connected to the controller.

The driver IC, the controller, etc., may be provided at any positions, and the positions are not limited to those described above.

The CF substrate 65 includes display elements formed on one side of the glass substrate 64 that is closer to the liquid crystal layer 66, such as the color filter 63 and a counter electrode 68, the color filter 63 including red, green and blue pixels 70 arranged in a matrix pattern and a light-blocking portion 71 arranged between the pixels 70.

The TFT substrate 62 and the CF substrate 65 include a polarizer plate (not shown) and a protection film (not shown), respectively, formed on the respective outer surfaces. Moreover, the TFT substrate 62 and the CF substrate 65 each include an alignment film (not shown), etc., formed on the electrodes 67 and 68, respectively.

Figure 4:
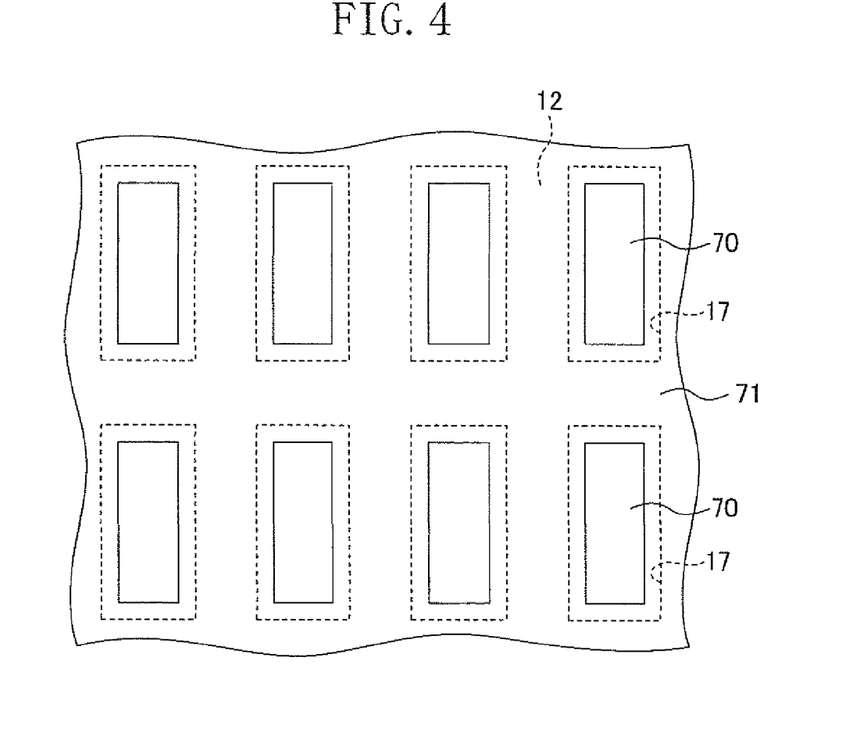
FIG. 4 shows the positional relationship, as viewed from above, between openings 17 of an in-panel-surface electrode 12 of the touch panel 10, and pixels 70 and a light-blocking portion 71 of a CF substrate 65 according to an embodiment of the present invention.

FIG. 4 shows the positional relationship, as viewed from above, between the openings 17 of the in-panel-surface electrode 12 of the touch panel 10 and the pixels 70 and the light-blocking portion 71 of the CF substrate 65 in the liquid crystal display device 50.

Each pixel 70 of the CF substrate 65 is provided in a region opposing the opening 17 of the in-panel-surface electrode 12. Therefore, it is possible to suppress the lowering of the brightness and the reflectance of the liquid crystal display panel 60, and to thereby improve the display quality.

Each pixel 70 of the CF substrate 65 is formed with a smaller area than the opening 17 of the in-panel-surface electrode 12. Therefore, it is possible to more accurately suppress the lowering of the brightness and the reflectance of the display panel, and to thereby improve the display quality.

Figure 5:
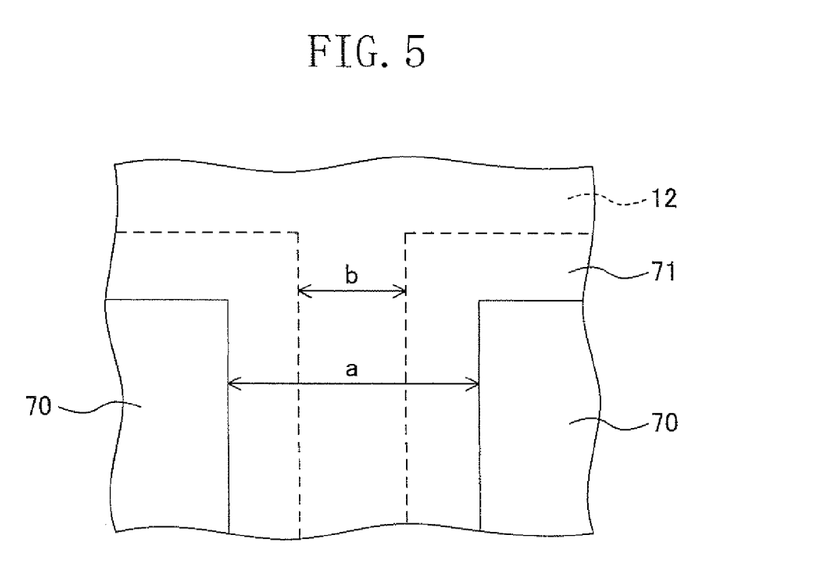
FIG. 5 shows the line width a of the light-blocking portion 71 of a color filter 63 and the lattice line width b of the in-panel-surface electrode 12 according to an embodiment of the present invention.

Moreover, in the gap between the pixels 70 of the CF substrate 65 and the openings 17 of the in-panel-surface electrode 12, the light-blocking portion 71 is provided in a line pattern so as to surround the pixels 70. As shown in FIG. 5, the light-blocking portion 71 is formed with the line width a thereof being greater than the lattice line width b of the in-panel-surface electrode 12 formed in a lattice pattern. Therefore, even if there is mask shifting when forming the light-blocking portion of the color filter 63 on a substrate by way of masking, or the like, it is possible to prevent the in-panel-surface electrode 12 from covering the pixels 70 of the color filter 63, and to thereby improve the display quality.

Figure 6:
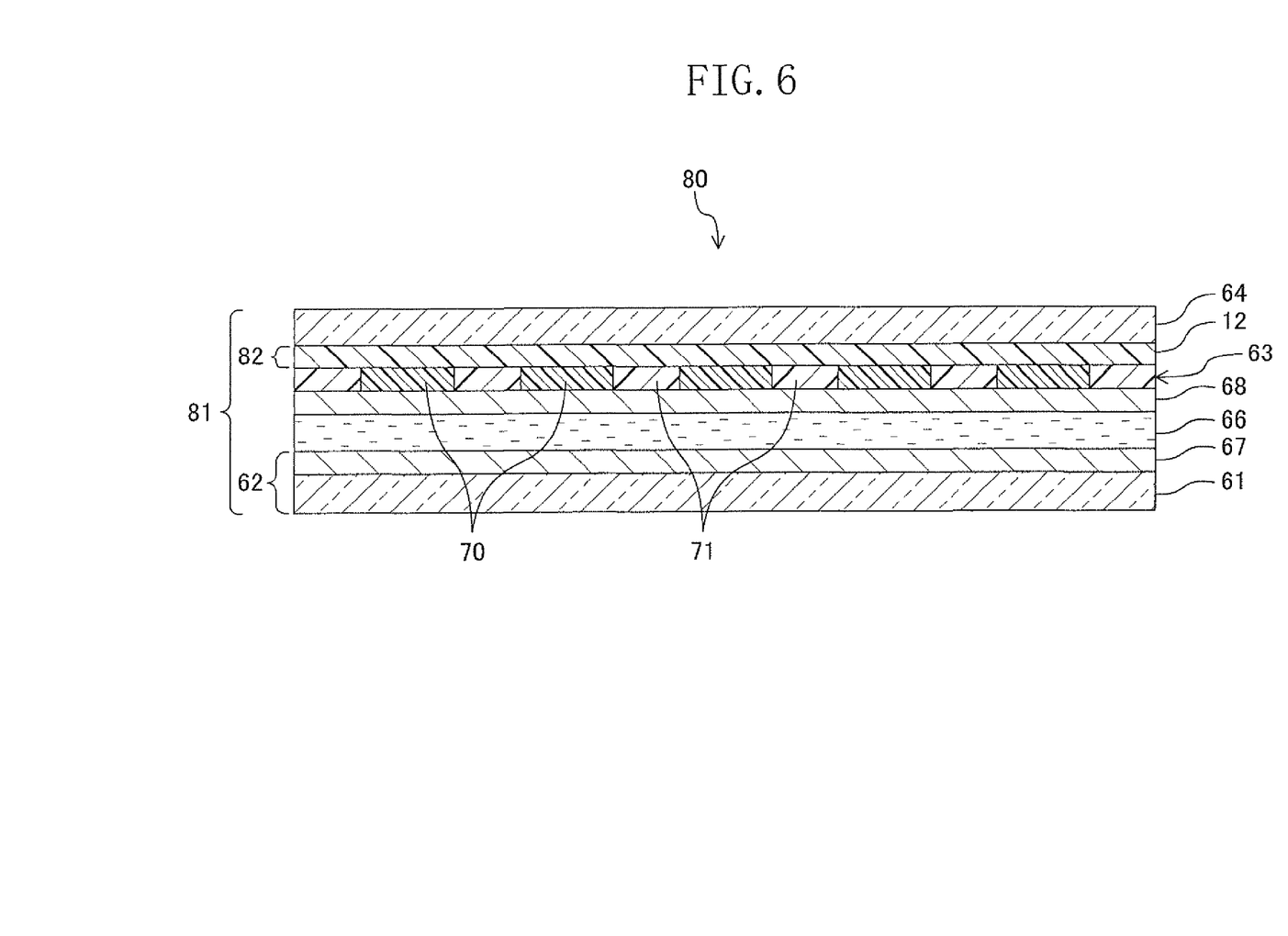
FIG. 6 is a cross-sectional view of a liquid crystal display device 80 according to an embodiment of the present invention.

The position of the in-panel-surface electrode of the touch panel is not limited to the position described above, but the configuration may alternatively be as shown in FIG. 6. In FIG. 6, like elements in form to those of the liquid crystal display device 50 described above will be denoted by like reference numerals, and will not be further described below.

FIG. 6 shows a cross-sectional view of a liquid crystal display device 80. The liquid crystal display device 80 includes the in-panel-surface electrode 12 formed on one side of the glass substrate 64 of the CF substrate 65, including the color filter 63, that is closer to the liquid crystal layer 66. In other words, the liquid crystal display device 80 has a configuration in which a touch panel 82 is incorporated in a liquid crystal display panel 81 having a layered structure.

(Function of Liquid Crystal Display Device 50 Provided with Touch Panel 10)

Next, the function of the liquid crystal display device 50 provided with the touch panel 10 will be described.

First, by a signal sent from the controller, the driver IC of the TFT substrate 62 activates the switching element being a thin film transistor, thereby altering the orientation of the liquid crystals.

As the orientation of the liquid crystals alters, characters and images are displayed on the surface of the liquid crystal display panel 60.

The controller that sends a signal to the driver IC at the same time sends a signal also to the driver circuit 19 of the touch panel 10 to thereby conduct a current through the outer wiring 14 to the four corners of the in-panel-surface electrode 12.

The current conducted to the four corners of the in-panel-surface electrode 12 through the outer wiring 14 passes through the bezel wiring 13 to give a voltage evenly across the entire in-panel-surface electrode 12.

In such a state, based on the characters and images displayed on the liquid crystal display screen, the touch surface of the touch panel 10 where an item to be selected is located is touched by a contact object such as a finger or a stylus.

When the touch surface of the touch panel 10 is touched by the contact object, the position of the in-panel-surface electrode 12 corresponding to the contacted portion is capacitively coupled to thereby alter the capacitance.

As the capacitance alters, the wires of the outer wiring 14 connected to the four corners of the in-panel-surface electrode 12 each carry a current signal therethrough that is in proportion to the distance to the contact object.

The current signals flowing through the wires of the outer wiring 14 connected to the four corners of the in-panel-surface electrode 12 are sent to the controller through the driver circuit 19, and the coordinates of the position of the contact object are calculated based on the current values.

Based on the calculated coordinates of the position, the controller again sends a signal to the driver IC of the TFT substrate 62 to thereby alter the characters and images on the liquid crystal display screen as intended.

(Method for Producing Liquid Crystal Display Device 50 Provided with Touch Panel 10)

Next, a method for producing the liquid crystal display device 50 provided with the touch panel 10 will be described.

(In-Panel-Surface Electrode Formation Step)

First, an IZO film (thickness: about 300 Å) is deposited on the insulative substrate 11 by a sputtering method.

Then, a resist of a photosensitive resin is applied on the IZO film to deposit a resist film, after which the resist film is subjected to exposure and development to thereby form a predetermined resist pattern.

Then, the IZO film is wet-etched into a lattice pattern by using the resist pattern described above as a mask to thereby form the in-panel-surface electrode 12.

(Wiring Formation Step)

Then, an aluminum film (thickness: about 2000 Å) and a titanium nitride film (thickness: about 1000 Å), for example, are deposited by a sputtering method on the insulative substrate 11 and the in-panel-surface electrode 12, respectively, as metal conductive films.

Then, a resist of a photosensitive resin is applied on a titanium nitride film to deposit a resist film, after which the resist film is subjected to exposure and development to thereby form a predetermined resist pattern.

Then, the aluminum film and the titanium nitride film are dry-etched using the resist pattern as a mask to thereby form the bezel wiring 13 and the outer wiring 14, respectively.

(Protection Film Formation Step)

Then, a silicon nitride film (thickness: about 1500 Å) is deposited by a CVD (Chemical Vapor Deposition) method, for example, so as to cover the insulative substrate 11, the in-panel-surface electrode 12, the bezel wiring 13 and the outer wiring 14.

Then, a resist of a photosensitive resin is applied on a silicon nitride film to deposit a resist film, after which the resist film is subjected to exposure and development to thereby form a predetermined resist pattern.

Then, the silicon nitride film is dry-etched or wet-etched using the resist pattern as a mask to thereby form the protection film 15.

The touch panel 10 is produced as described above.

(Liquid Crystal Display Device Producing Step)

Then, a step of producing the liquid crystal display device 50 provided with the touch panel 10 will be described.

(CF Substrate Formation Step)

First, the glass substrate 64 is prepared. Then, the light-blocking portion 71 is formed by forming a black matrix having a width of about 5 to 50 µm between the pixels 70 by a sputtering method on the glass substrate 64 (10 mm or less). Then, a resin film (dry film) with a red pigment dispersed therein is laminated across the entire surface of the display area on the glass substrate 64, and is subjected to exposure, development and baking (heat treatment) to thereby form a first color layer (red). Then, a resin film with a green pigment dispersed therein is laminated entirely across the entire surface over the first color layer, and is subjected to exposure, development and baking (heat treatment) to thereby form a second color layer (green). Similarly, a third color layer (blue) is formed. Then, ITO is vapor-deposited on the color layers to form the counter electrode 68, and then an alignment film is formed.

The CF substrate 65 is produced through steps as described above.

(TFT Substrate Formation Step)

Then, the glass substrate 61 is prepared, and a gate electrode and a gate insulating film are formed. Then, an etching protection film is formed and patterned. Then, a contact hole, a drain electrode and a source electrode are formed. Then, in the same step or in a separate step, the driver IC is provided in the substrate end portion, a thin film transistor is formed, and moreover a controller is formed. Then, ITO is vapor-deposited and patterned to form the pixel electrode 67. Then, a plurality of spacers for defining the cell thickness are formed through a photolithography step. The spacers may be formed on the side of the CF substrate 65.

The TFT substrate 62 is produced through steps as described above.

(Liquid Crystal Display Panel Formation Step)

Then, a sealant is applied in a continuous and uninterrupted manner on the light-blocking portion of the TFT substrate 62.

Then, for example, 2 mg per shot of a liquid crystal material is dripped onto the TFT substrate 62 by using a dispenser, or the like. In this process, the liquid crystal material is dripped inside the sealant applied in a frame pattern around the light-blocking portion of the TFT substrate 62.

Then, the CF substrate 65 is aligned with and attached to the TFT substrate 62, onto which the liquid crystal material has been dripped. In this process, a liquid crystal display cell is formed in a region between the CF substrate 65 and the TFT substrate 62 attached together that is surrounded by the sealant. This step is performed in a vacuum. Then, as the structure is brought back into the atmosphere, the liquid crystal material between the TFT substrate 62 and the CF substrate 65 attached together is dispersed by the atmospheric pressure.

Thus, the liquid crystal display panel 60 is produced by sealing a liquid crystal material between two substrates to thereby obtain attached substrates, and by providing a protection film on both surfaces thereof.

Then, the touch panel 10 is provided on one surface of the liquid crystal display panel 60 that is closer to the CF substrate 65, thereby electrically connecting the driver circuit 19 of the touch panel 10 with the controller of the liquid crystal display panel 60.

Moreover, a backlight, or the like, is provided on the surface closer to the TFT substrate 62 to complete the liquid crystal display device 50.

With the touch panel 10 of the present embodiment, a plurality of openings may also be formed in the bezel wiring 13 surrounding the display area on the in-panel-surface electrode 12.

With the touch panel 10 of the present embodiment, the bezel wiring 13 of the in-panel-surface electrode 12 may be formed so that the aperture ratio increases toward the display area. Specifically, the area of an opening increases toward the closest opening (closer to the display area).

Moreover, the touch panel 10 of the present embodiment may be formed so that the aperture ratio of the bezel wiring 13 quadratically increases toward the display area. Specifically, the openings are formed so that ones closer to the display area are gradually larger, with the area of an opening quadratically increasing toward the closest opening (closer to the display area).

With the touch panel 10 of the present embodiment, the bezel wiring 13 may be formed so that the aperture ratio is lower than that in the display area. Specifically, the aperture ratio per unit area of the bezel wiring 13 may be smaller than that in the display area, e.g., an opening in the bezel wiring 13 being smaller than an opening in the display area.

With such a configuration, the display area is a high-resistance electrode portion, whereas the bezel wiring 13 in contrast is a low-resistance electrode portion. Therefore, the panel surface position detection precision is improved. Moreover, it is not necessary to separately form a low-resistance electrode outside the display area, thereby improving the device production efficiency.

Moreover, with the touch panel 10 of the present embodiment, the bezel wiring 13 may be formed so that the aperture ratio decreases along each side toward the center thereof. Specifically, as indicated by arrows in FIG. 5, the area of the opening decreases toward the closest opening (closer to the center along each side).

Figure 8:
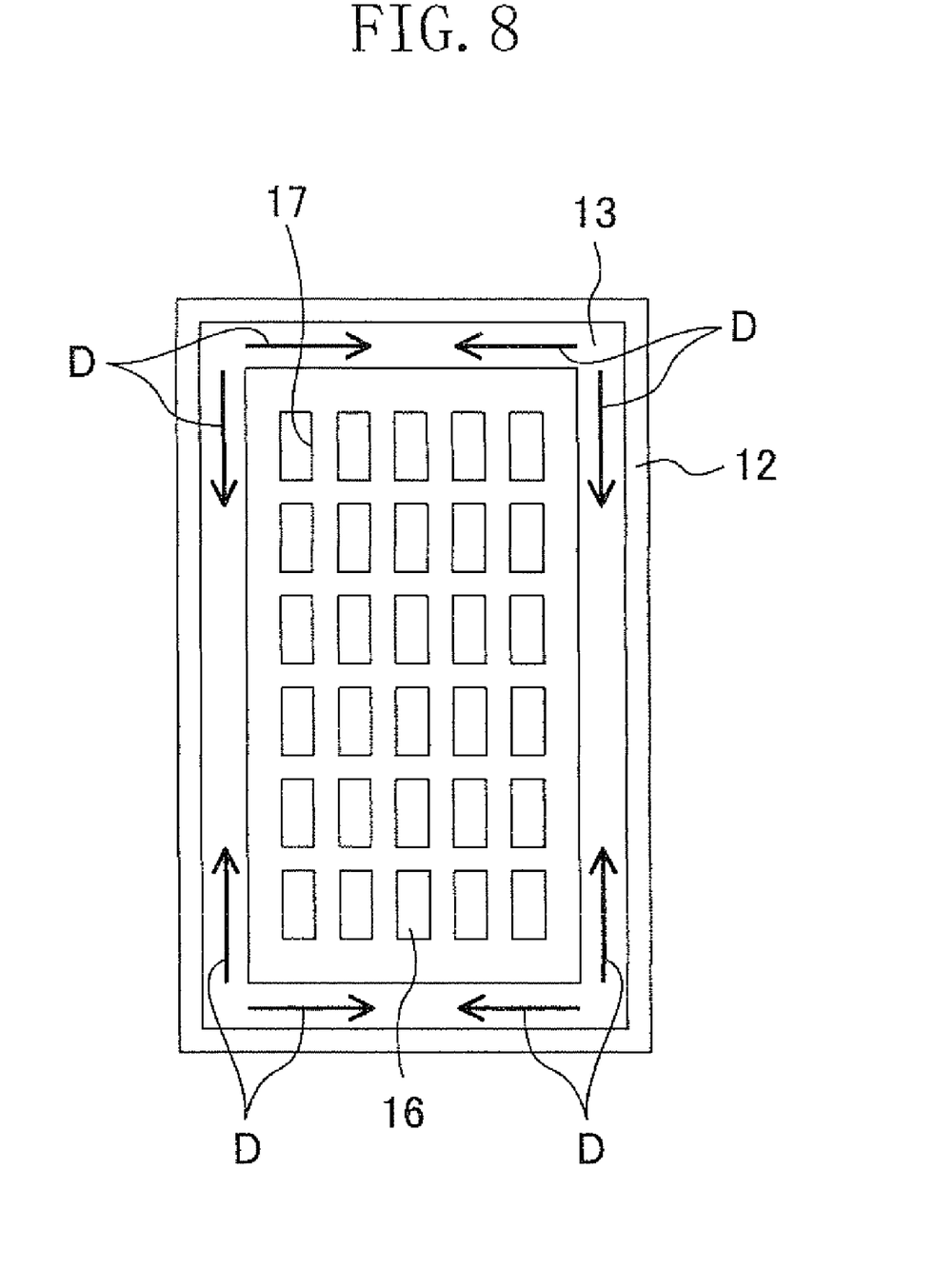
FIG. 8 shows the direction in which the aperture ratio decreases along each side of a bezel wiring 13 of the in-panel-surface electrode 12 according to an embodiment of the present invention.

The touch panel 10 of the present embodiment may be formed so that the aperture ratio of the bezel wiring 13 quadratically decreases along each side of the frame region toward the center thereof. Specifically, as indicated by the direction D in FIG. 8, the area of the opening quadratically decreases toward the closest opening (closer to the center along each side).

Moreover, the touch panel 10 may have a configuration where the bezel wiring 13 including the conductive layer 20 and the protection layer 21 is not provided in the region where the bezel wiring 13 is formed (the frame region) because the position detection precision is improved if the resistance is lower than the touch surface corresponding region.

Furthermore, while a liquid crystal display device has been used as an example of the display device, the present invention is not limited thereto, but the present invention can be used with other display devices such as PDP (plasma display panel), EL (electroluminescence), electrophoretic display or SED (surface-conduction electron-emitter display).

A configuration of a display device will be described below, where the touch panel of the present invention is used in an EL display device.

Figure 7:
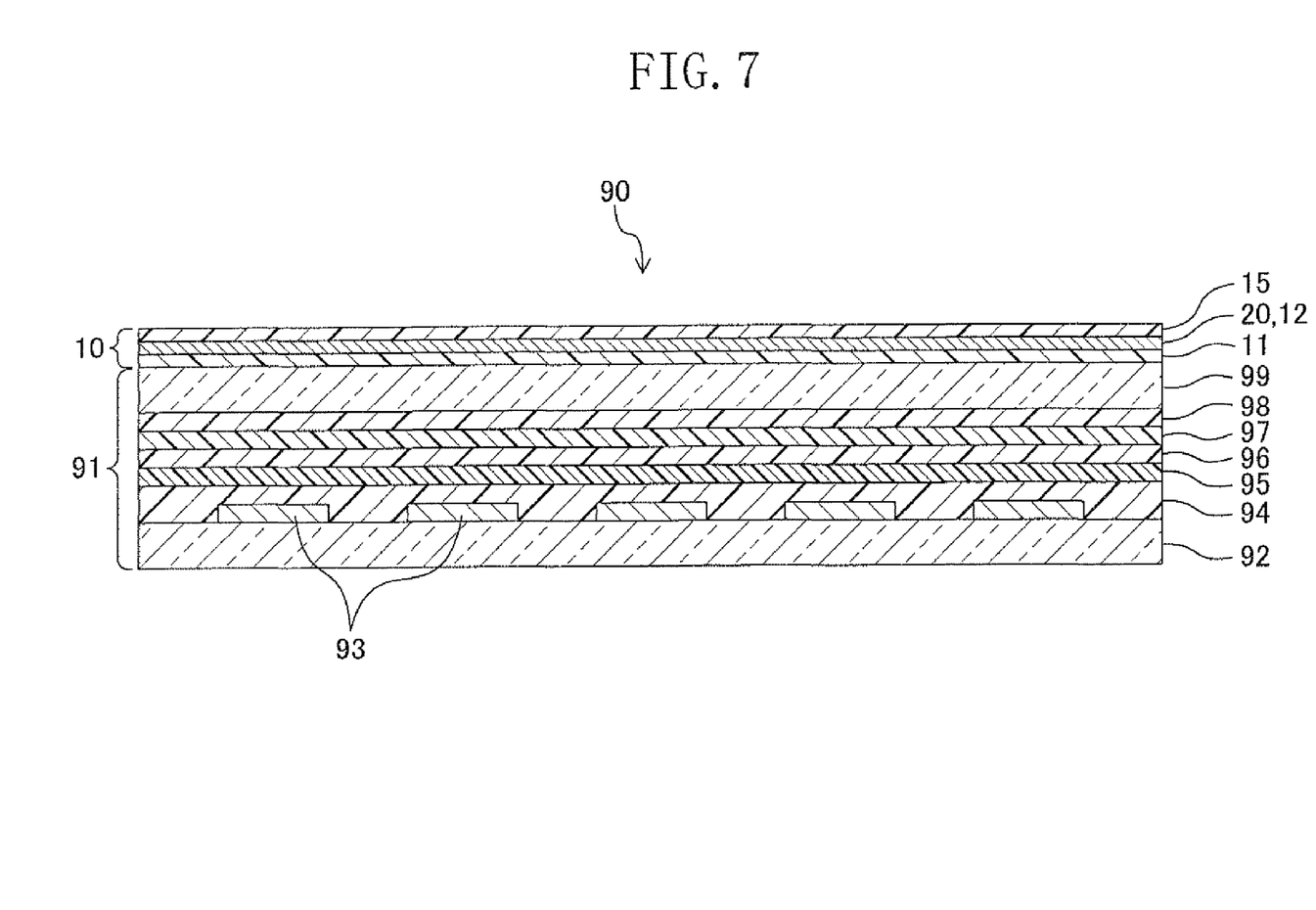
FIG. 7 is a cross-sectional view of an EL display device 90 according to an embodiment of the present invention.

FIG. 7 is a cross-sectional view of an EL display device 90 provided with the touch panel 10 described above. The EL display device 90 includes an EL display panel 91, and the touch panel 10 layered thereon.

The EL display panel 91 includes a glass substrate 92, a first electrode 93, a first dielectric layer 94, a semiconductor film 95, an EL crystallized light-emitting film (EL element) 96, a second dielectric layer 97, a second electrode 98, and a glass substrate 99, which are layered together in this order from the bottom.

The EL display device 90 having such a configuration has a desirable touch position detection precision since it is provided with the touch panel 10 as described above.

(Functions and Effects)

Next, functions and effects will be described.

With the liquid crystal display device 50 provided with the touch panel 10 according to an embodiment of the present invention, a plurality of openings 17 are formed in the display area of the in-panel-surface electrode 12, whereby the resistance value of the in-panel-surface electrode 12 can be increased accordingly. Moreover, since the area of the in-panel-surface electrode 12 is reduced by the openings 17, it is possible to accordingly decrease the parasitic capacitance and increase the light transmittance. Therefore, the touch position detection precision of the touch panel 10 is improved.

INDUSTRIAL APPLICABILITY

As described above, the present invention is useful for a display device provided with a touch panel.

The invention claimed is:

1. A display device provided with a touch panel, comprising:
    a touch sensitive region including a plurality of pixels and located inside a frame region of the display device, the touch sensitive region extending across a display area of the device;
    the touch panel for detecting a contact position on a touch surface of the panel at which a contact object is brought into contact with the touch surface, the touch panel including an in-panel-surface electrode with a plurality of openings formed in the display area, and
    wherein touch position detection on the display device is provided via said in-panel-surface electrode, and wherein said in-panel-surface electrode with said openings defined therein is electrically continuous across the touch sensitive region and display area of the display device.

2. The display device provided with a touch panel of claim 1, wherein the in-panel-surface electrode is formed so that an aperture ratio thereof increases toward a center of the display area.

3. The display device provided with a touch panel of claim 2, wherein the aperture ratio of the in-panel-surface electrode quadratically increases toward the center of the display area.

4. The display device provided with a touch panel of claim 1, wherein the plurality of openings are formed regularly on a surface of the in-panel-surface electrode.

5. The display device provided with a touch panel of claim 4, wherein the in-panel-surface electrode is formed in a generally lattice pattern having the plurality of openings.

6. The display device provided with a touch panel of claim 1, wherein a liquid crystal display panel having a color filter is further provided so as to be layered on the touch panel.

7. The display device provided with a touch panel of claim 6, wherein the in-panel-surface electrode is formed on a substrate on which the color filter of the liquid crystal display panel is formed.

8. The display device provided with a touch panel of claim 7, wherein the in-panel-surface electrode is formed on one side of the substrate on which the color filter is formed that is closer to a liquid crystal layer.

9. The display device provided with a touch panel of claim 6, wherein the color filter includes a plurality of pixels arranged in a matrix pattern.

10. The display device provided with a touch panel of claim 5, wherein the pixels of the color filter are provided in regions opposing the openings of the in-panel-surface electrode.

11. The display device provided with a touch panel of claim 10, wherein an area of a pixel of the color filter is smaller than that of an opening of the in-panel-surface electrode.

12. The display device provided with a touch panel of claim 11, wherein:
    the color filter includes a light-blocking portion provided in a line pattern so as to surround the pixels; and
    a line width of the light-blocking portion is larger than each lattice line width of the in-panel-surface electrode formed in a lattice pattern.

13. The display device provided with a touch panel of claim 1, wherein a plurality of openings are formed also in a frame region surrounding the display area on the in-panel-surface electrode.

14. The display device provided with a touch panel of claim 13, wherein an aperture ratio of the frame region of the in-panel-surface electrode increases toward the display area.

15. The display device provided with a touch panel of claim 14, wherein the aperture ratio of the frame region quadratically increases toward the display area.

16. The display device provided with a touch panel of claim 13, wherein an aperture ratio of the frame region is lower than that of the display area.

17. The display device provided with a touch panel of claim 13, wherein an aperture ratio of the frame region decreases along each side of the frame region toward a center thereof.

18. The display device provided with a touch panel of claim 17, wherein an aperture ratio of the frame region quadratically decreases along each side of the frame region toward a center thereof.

19. The display device provided with a touch panel of claim 1, wherein the in-panel-surface electrode is formed by a transparent conductive material.

20. The display device provided with a touch panel of claim 1, wherein the transparent conductive material is at least one of ITO, IZO, ZnO and SnO2.

21. The display device provided with a touch panel of claim 1, wherein:
    the in-panel-surface electrode is formed in a rectangular shape; and
    current detection means for detecting a current flowing through the in-panel-surface electrode is electrically connected to each of four corners of the in-panel-surface electrode formed in a rectangular shape.

22. The display device provided with a touch panel of claim 1, further comprising an EL display panel, the EL display panel including:
    a first substrate including an electrode, and a second substrate opposing the first substrate; and
    an EL element provided between the first and second substrates,
    wherein the touch panel is provided so as to be layered on the second substrate of the EL display panel.

* * * * *